E. WHITEHEAD.
VELOCIPEDE.

No. 88,426.  Patented Mar. 30, 1869.

Witnesses:

Inventor:

EDWARD WHITEHEAD, OF CINCINNATI, OHIO.

Letters Patent No. 88,426, dated March 30, 1869.

IMPROVED VELOCIPEDE.

The Schedule referred to in these Letters Patent and making part of the same.

*To whom it may concern:*

Be it known that I, EDWARD WHITEHEAD, of Cincinnati, Hamilton county, Ohio, have invented certain new and useful Improvements in Velocipedes; and I hereby declare the following to be a full, clear, and exact description thereof, reference being had to the accompanying drawings, making part of this specification.

This invention relates to that class of vehicles commonly known as three-wheeled velocipedes; and The first part of my improvements consists in connecting the front, or steering-wheel to the frame of the machine, by means of a ball-and-socket joint, which arrangement permits of said wheel being turned either to the right or left, for the purpose of guiding the velocipede whenever it is propelled along the ground.

The second part of my improvement consists in such a construction of the machine as will permit of an independent rotation of either of the hind wheels, for the purpose of assisting in turning the velocipede either to the right or left, as may be desired, and such an arrangement of its operative parts that a number of riders may assist in propelling it.

In the accompanying drawings—

Figure 1:
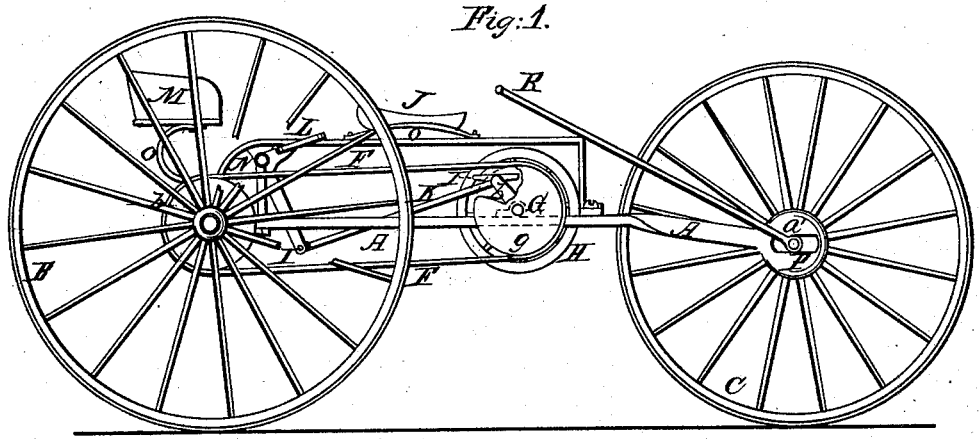
Figure 1 is side elevation of a velocipede provided with my improvements.
Figure 2:
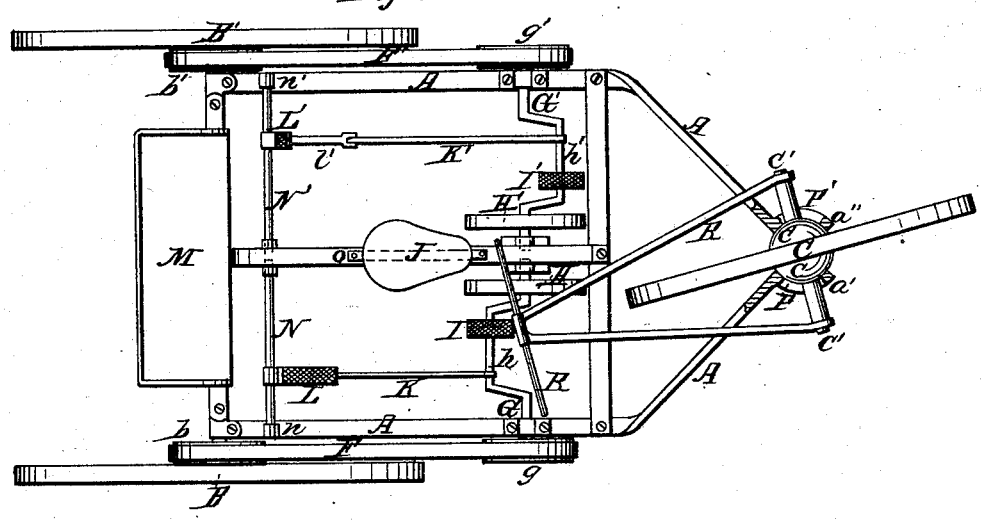
Figure 2 is a plan of the same, partially in section.
Figure 3:
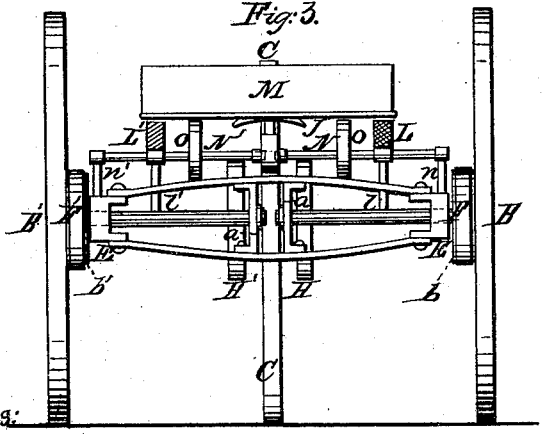
Figure 3 is a rear elevation of the vehicle.

The operative parts of my velocipede are carried upon a frame, A, which is supported upon two driving-wheels, B B, and a steering, or guiding-wheel, C, and said driving-wheels are keyed fast to the parts D D' of the duplex axle, which are journalled in boxes, E, and braces, a, of the frame.

Fitted to the inner sides of the driving-wheels, are pulleys, b b', around which pass belts, F F', which are driven by pulleys, g g', upon the outer ends of the separate crank-shafts G G', the latter being provided with fly-wheels, H H', for the purpose of equalizing the rotation of said crank-shafts.

Supported upon the cranks h h' of said crank-shafts, are pedals, I I, which are operated by the feet of the rider who occupies the front seat J.

Projecting rearward from the cranks h h', are pitmen, K K', that connect with the lower arms l l' of two bell-cranks, whose upper members, L L', serve as pedals, which are to be driven by the occupants of the hind seat M, the latter being located directly above the duplex axle D D'.

The bell-cranks L L', l l', are hung upon shafts N N', which are supported upon pillars, n n', that project vertically from the frame A; and said bell-cranks may be adjusted longitudinally of the shafts N N', for the purpose of bringing the pedals L L' into the most convenient position for the operator or operators.

The seats J and M may be supported upon spring-bars, O

The hub c of the steering-wheel C is spherical, as shewn, and it is fitted within the curved portions a' a" of the frame A, so as to form a ball-and-socket joint, which will permit of said wheel being turned either to the right or left, for the purpose of guiding the velocipede.

The sockets a' a" of the frame are slotted, at P P', and said slots are traversed by the axle c' of the wheel C. The outer ends of this axle have attached to them the tiller R, which projects back a sufficient distance to permit of its being grasped by the hands of the rider who occupies the front seat J.

It will be seen that this velocipede is propelled by means of the rider bringing his feet to bear upon the pedals I I', so as to cause a rotation of the crank-shafts G G'; but, if desired, the rider may be assisted by one or two persons, who can be mounted upon the hind seat M; thus permitting of one, two, or three people being engaged in operating the machine.

The velocipede may be turned completely around in a space not exceeding its own length, by simply operating one driving-wheel, whilst the other is held stationary, and, in some cases, the driving-wheels may be rotated in opposite directions.

A modification of my invention may consist in the employment of endless chains or cog-wheels, in lieu of the belts F F'.

I claim herein as new, and of my invention—

1. The combination, with the steering, or guiding-wheel C, of the spherical hub c, the curved socket a' a", axle c', and slot P, substantially as and for the purpose described.

2. The combined arrangement of the pedals I I' and L L' with the saddle J and seat M, substantially as described, for the purpose set forth.

3. The general arrangement and combination of the frame A, a' a", P P', driving-wheels B B', b b', guiding-wheel C, c c', divided axle D D', belts F F', pulleys g g', crank-shafts G G', H H', h h', pedals I I', pitmen K K', bell-cranks L L', l l', and tiller R, for the purpose of producing an improved three-wheeled velocipede.

In testimony of which invention, I hereunto set my hand.

EDWARD WHITEHEAD.

Witnesses:
GEO. H. KNIGHT,
JAMES H. LAYMAN.